June 18, 1963　　　H. KIETZ ETAL　　　3,094,681
NON-LINEAR RECORDING AMPLIFIER
Filed May 25, 1954　　　　　　　　　　　　　　　　4 Sheets-Sheet 1
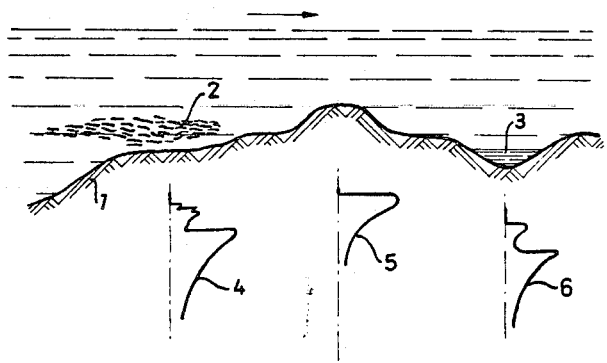
Fig. 1a
Fig. 1b
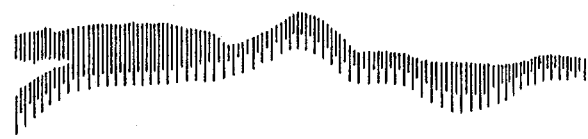
Fig. 1c
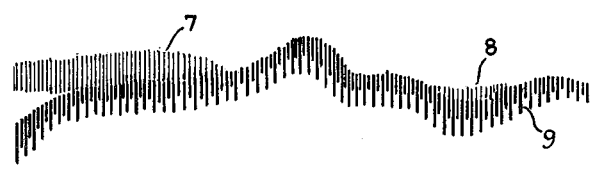
Fig. 1d
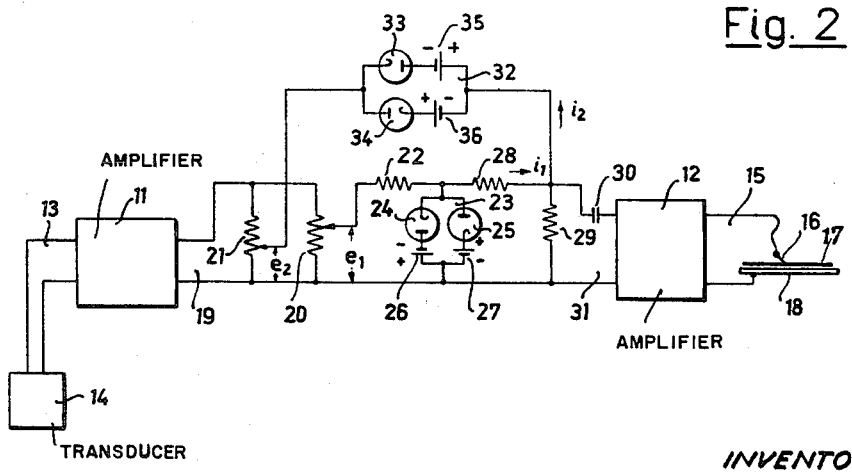
Fig. 2
INVENTORS
Hans KIETZ
Hans Georg SCHLOEN Inventors
Hans Kietz
Hans Georg Schloen June 18, 1963 H. KIETZ ETAL 3,094,681
NON-LINEAR RECORDING AMPLIFIER
Filed May 25, 1954 4 Sheets-Sheet 3

Inventors
Hans Kietz
Hans Georg Schloen
By [signature]
Their Attorney

June 18, 1963

H. KIETZ ETAL 3,094,681

NON-LINEAR RECORDING AMPLIFIER

Filed May 25, 1954

Inventors
Hans Kietz
Hans Georg Schloen

United States Patent Office 3,094,681
Patented June 18, 1963

3,094,681
NON-LINEAR RECORDING AMPLIFIER
Hans Kietz and Hans Georg Schloen, Bremen, Germany, assignors to Atlas-Werke Aktiengesellschaft, Bremen, Germany, a firm
Filed May 25, 1954, Ser. No. 432,222
21 Claims. (Cl. 340—3)

The present invention relates to amplifying apparatus incorporating non-linear elements for obtaining improved contrast in marking electrical recordings on electro-sensitive paper, particularly for use with echo sounding recorders.

In recorders for the recording of the depth of water by the echo method a marking stylus periodically travels at uniform speed across the electro-sensitive chart paper having a printed scale on it. At the moment when the marking stylus passes through the zero-line a short sound pulse of a suitable frequency is emitted which will return as an echo after reflection from the sea bed or other objects floating in the sea. After suitable amplification this echo will produce a mark on the recording paper. The distance of the mark from the zero-line is a measure of the depth of the sea or of the distance to reflecting objects. This principle underlies the use of recorders for the detection of shoals of fish. As the sound pulse is not only propagated in a vertically downward but also in an oblique direction, the echo which indicates the shortest distance from the seabed is followed by other echoes which had to travel over longer distances. Thus the entire echo signal is of considerably longer duration than the radiated sound pulse and is recorded as a relatively long line of decreasing intensity.

For this reason the depth marks made side by side on the slowly advancing recording paper form a broad line whose front edge indicates the shortest distance from the reflecting object. In trawling the shoals of fish to be detected are close to the sea bottom. The identification of recordings of such shoals of fish close to the sea bottom is often difficult because the recorded echo signals tend to merge with those of the seabed.

Although the fish echo is weaker than the sea bottom echo, the recordings of the two both appear equally black. This is due to the unfavorable gradation characteristic of the electro-sensitive paper. It is rather difficult to obtain different intensities in recording by suitably selecting the recording current. With one kind of recording paper, for instance, which has a coating of lead thiosulphate, the total contrast range is traversed for a 3:1 pulse amplitude ratio.

The intensities of recordings are now and hereafter spoken of as shades of gray or blackening without considering the fact that some recording papers may yield colored recordings.

If the degree of amplification of the echoes is chosen so that the sea bottom echo is just sufficient to produce a complete blackening, fish echoes which are somewhat below half the amplitude of the sea bottom echo will be recorded perceptibly weaker. However, echoes which have one fourth the intensity of the sea bottom echo and less are no longer recorded. For this reason, in practical operation it is necessary to use a higher degree of amplification at which also the most feeble of the interesting fish echoes, e.g. of $\frac{1}{100}$ the amplitude of the sea bottom fish echoes, are recorded. All fish echoes of amplitude which exceeds $\frac{1}{30}$ of the sea bottom echo will then be recorded with the same intensity as the last one. Moreover, when a high degree of amplification is used, with common amplifiers the sea bottom echo is recorded with a current of excessive intensity so that the recording paper is damaged and offensive fumes are generated in excessive quantity.

Moreover, it is difficult to obtain contrasting recordings of echoes of different amplitudes with common amplifiers by reason of the fact that the amplitude of the echo is subject to time fluctuations which may cause the intensity of the recording to change from gray to black or vice versa.

The same difficulty which appears with the recording of echoes of fish close to the seabed, as described above, is also encountered when layers of the sea bed are recorded, e.g. the depth curve of the surface of a mud layer and the depth curve of a more solid sand layer which is beneath it. The two echo curves frequently approach one another so closely that they will merge one with the other when recorded in the same degree of blackness. Here, too, it is difficult or even impossible with common amplifiers to record the two curves in different shades of blackening in order to enable to distinguish them.

An object of the present invention is to provide amplifying apparatus incorporating non-linear elements for the recording of partly overlapping echo sounding curves running in proximity to one another on electro-sensitive paper, by means of which apparatus the two curves are recorded in different intensities of blackness, particularly the curve corresponding to the smaller distance in a lighter shade of gray, so that the curves can be distinguished from one another.

Another object of the present invention is to provide amplifying apparatus incorporating non-linear elements by means of which apparatus echo signals from different contiguous ranges of amplitudes can be recorded in different shades of blackening independent of fluctuations occurring within each range of amplitudes.

A further object of the invention is to record echo signals of different origin in contrasting shades of gray on a common recording strip to enable different sources of recorded echo curves, which may be partially overlapping, to be distinguished. One means for achieving this object comprises limiting amplifiers providing a recording current in response to received echo signals, the magnitude of the recording current being substantially independent of the echo signal amplitude over a wide dynamic range.

Still another object of this invention is to increase, by means of an amplifier arrangement having an approximately logarithmic characteristic produced by a non-linear resistance element, the range of amplitudes of the echo signals within which these are recorded in shades of gray gradually increasing in blackness with the amplitude of the signals, the range being increased to a multiple of the range obtainable without the means of this invention.

According to the invention, received echo signals of different amplitudes are recorded with contrasting intensity. In a specific embodiment of the invention, received echo signals are classified into weak and strong signals. The strong signals are recorded with maximum permissible intensity while the weak signals are recorded with lesser intensity. Means are provided for adjustably selecting the received signal amplitude which separates weak signals from strong signals.

In one embodiment of the invention, the weak and strong signals are delivered to the recording stylus through first and second parallel channels. The first channel includes limiting means for providing a recording signal which does not exceed a predetermined maximum level corresponding to a trace intensity less than the maximum permissible intensity. If the amplitude of the received signal exceeds a predetermined minimum, the output of the second channel adds to that of the first channel to provide a combined recording signal which intensifies the recording medium more than that caused by the first channel recording signal alone. Separate gain adjusting means are provided in each channel. The first channel gain determines the minimum amplitude received signal which will cause a visible trace while the gain of the second channel determines the minimum amplitude received signal which will cause an intensified trace, the second channel gain being less than the first channel gain in order to classify the received signals into weak and strong groups. A bottom clipper may be provided in the second channel to sharpen the transition between weak and strong signals.

Numerous other features, objects and advantages of the invention will become apparent from the following specification when read in connection with the accompanying drawing in which:

FIG. 1a is a pictorial representation of a section of the sea showing different objects with respect to the sea bottom;

FIG. 1b is a graphical representation of echo signals typically resulting from searching the section immediately above in FIG. 1a;

FIG. 1c shows the recorded signal derived from recording echo signals in response to searching pulses directed toward the sea bottom of FIG. 1a in accordance with conventional techniques;

FIG. 1d shows the same signals recorded according to the invention;

FIG. 2 shows an amplifier circuit arrangement comprising an amplitude limiter and a bottom clipper for the recording of echo signals from two different contiguous amplitude ranges with different degrees of blackness;

Figure 3:
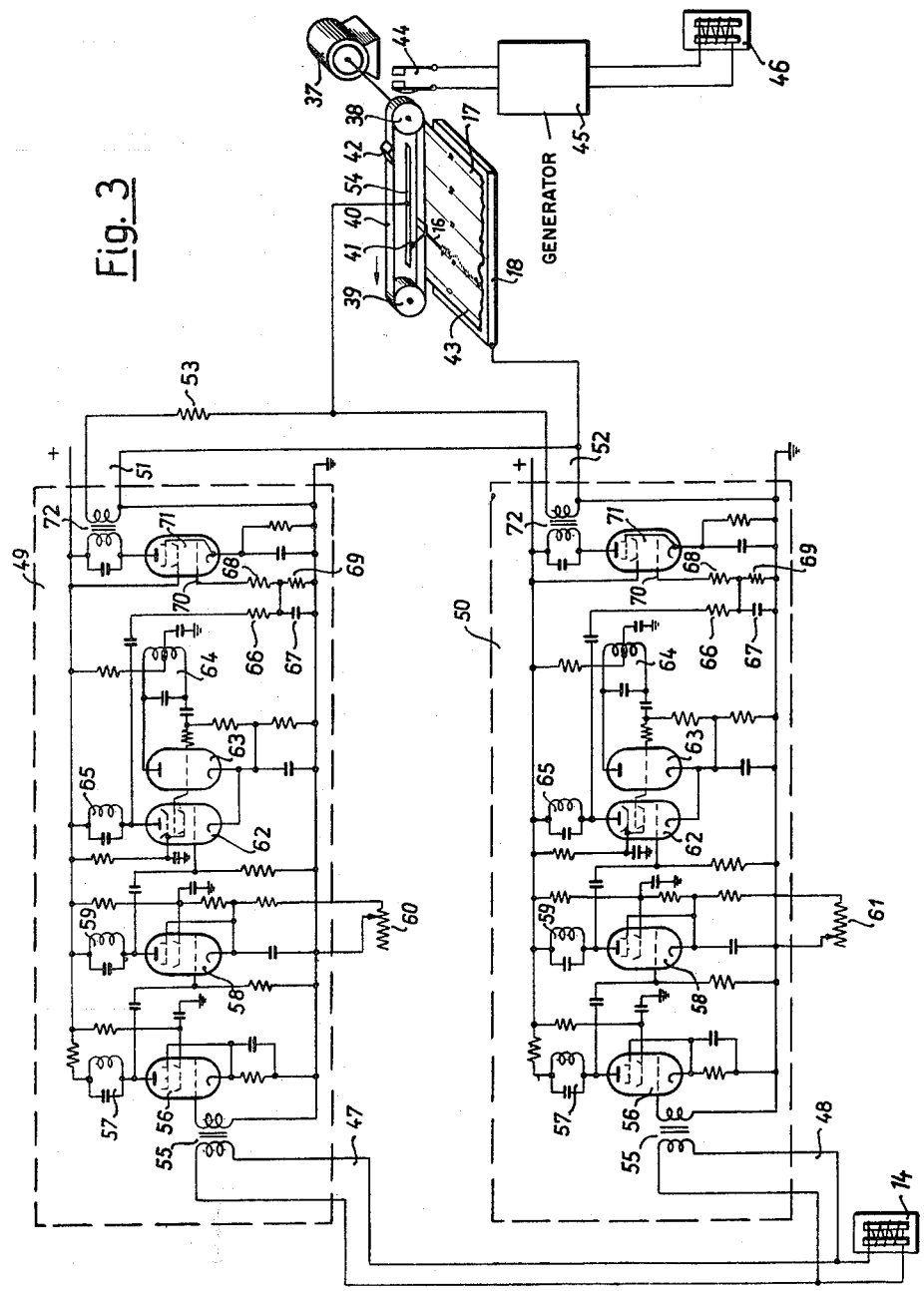
FIG. 3 shows an arrangement of two amplifiers with different saturation values of the output current and having gains which are in an inverse ratio to the saturation currents, this arrangement serving the same purpose as that shown in FIG. 2.

FIG. 1a represents a part of the solid seabed 1, a shoal of fish 2, part of which is only a small distance from the ground, and a hollow filled with mud 3. The arrow indicates the heading of a ship when taking the echo curve of the profile of the seabed.

FIG. 1b shows the shape of the amplitude envelope of the echoes obtained from various spots. While curve 5 shows the echo of the solid seabottom 1, curve 4 shows the echo of the seabed preceded by a feeble echo originating from the shoal of fish 2. Similarly, a feeble echo originating from the mud layer 3 precedes the sea bottom echo in curve 6.

Experience has shown that it is impossible with conventional amplifiers to adjust the degree of amplification so that the two different echo amplitudes occuring in 4 and 6 are contrastingly recorded. If the gain is adjusted so high that the feeble echoes are recorded with certainty despite their fluctuations, these echoes will be recorded with the same intensity as the sea bottom echoes and, when the distance between the two echo curves is small, the recordings will merge into one as shown in FIG. 1c. Only at the left end of the recording where the distance of the shoal of fish from the bottom is greater, do the two echo curves appear separately. By means of an amplifier arrangement according to this invention it is possible to record the upper curve in a lighter shade than the lower which results in a recording as shown in FIG. 1d, where objects previously not perceptible in echo sounding can now distinctly be seen at 7 and 8 as distinguished from the seabed 9.

FIG. 2 shows the circuit diagram of an amplifier arrangement using non-linear elements for the recording of echo curves. 11 and 12 are amplifiers, the amplification of which is chosen according to the intensity of the echo signals to be recorded and according to the recording current required. A transducer 14 for the reception of the echo signals is connected to the input 13 of the amplifier 11. The output 15 of the amplifier 12 supplies a recording current derived from input echo signals, which current flows from the marking stylus 16 of a recorder (not shown) through the recording paper 17 to the platen 18, thereby producing markings on the paper. Two, preferably logarithmic, potentiometers 20 and 21 are connected to the output of the amplifier 11.

The voltage $e_1$ drawn from the potentiometer 20 is applied through a resistor 22 to a voltage limiter 23 comprising two diodes 24 and 25 in parallel connection and two potential sources 26, 27 in series therewith. Two resistors 28, 29 in series connection are connected across the voltage amplitude limiter and the current $i_1$ flowing through these resistors is proportional to the output voltage from the voltage amplitude limiter 23. The voltage thus produced across resistor 29 is applied through a condenser 30 to the input 31 of the amplifier 12, the amplifier input resistance being high compared to that of resistor 29.

The voltage $e_2$ drawn from the potentiometer 21 is supplied through a bottom clipper 32 comprising the parallel combination of oppositely poled diodes 33 and 34, each in series with a respective potential source 35 and 36, the parallel combination being in series with the junction point of the resistors 28, 29, the drop in potential across resistance 29 being applied through condenser 30 to the input 31 of the amplifier 12.

The values of the resistors are chosen as follows:

10 kiloohms for the potentiometers 20 and 21,
20 kiloohms for the resistors 22, 29 and
60 kiloohms for the resistor 28.

The potential difference $E_1$ produced by the sources of potential 26, 27 equals a few volts. The potential difference $E_2$ produced by the sources 35, 36 is preferably equal to or larger than this value.

When echo signals are received, the amplitude of the alternating current voltage across the amplitude limiter 23 can never exceed $\pm E_1$, even if $e_1$ is a multiple of that value. Therefore, the partial voltage at the resistor 29 can never exceed a certain value, which for the above indicated values of the resistors 28, 29 is $\frac{1}{4}E_1$. The amplification of the second amplifier 12 is set once and for all to such a value that the recording current produced at this input voltage produces a recording in a gray shade as distinguished from complete blackening of the paper. In order to attain the highest usable sensitivity of the sounding device in detecting objects in the sea, the sliding contact of the potentiometer 20 is pushed upwards until the noise level prevailing at the transducer 14 will produce feeble recordings which do not impair the distinctness of echo signals. When echo signals of slightly higher amplitude arrive, the amplitude limiter 23 becomes operative and these and all stronger echo signals up to a certain limit which are transmitted from the potentiometer 20 to the amplifier 12 are recorded in an unvarying shade of gray.

In contradistinction to echoes having a small amplitude as they are received from shoals of fish, the stronger sea bottom echo is recorded in a completely black shade. This results from there being provided a second path by which echo signals may be transmitted to the input of amplifier 12.

For amplitudes of the alternating current voltage $e_2$ taken off the potentiometer 21 smaller than $E_2$ the bottom clipper 32 will not allow any current $i_2$ to flow. Only if the voltage $e_2$ exceeds this value, there will be a current $i_2$. If $E_2=2E_1$, then for $e_2=1.5\ E_2$ the voltage across the resistor 29 generated by the current $i_2$ is $e_2-E_2=0.5\ E_2=E_1$. This voltage is four times as high as that originating from $i_1$ and is sufficient as an input voltage to the amplifier to produce an output current by which the echo signal is recorded in a completely black shade. The mutual interference between the two circuits fed from the potentiometers 20 and 21 has not been taken into account in the above description of their operation as the error resulting therefrom is negligible.

In order to have the sea bottom echo recorded in black, the potentiometer 21 is so adjusted that the alternating current voltage amplitude $e_2$ due to the sea bottom echo is $n$-times the value of $E_2$, where $n$ has to be at least equal to 1.5 for the values of the voltages $E_1$, $E_2$ and resistors 28, 29 given above. All echoes having an amplitude between the noise level and $1/n$ of the sea bottom echo and particularly the echoes of shoals of fish, which in general are considerably more feeble than the sea bottom echo, are recorded in a gray shade. Echoes the amplitudes of which are within the range between $1/n$ and about $1.3/n$ of the sea bottom echo are recorded in shades varying between gray and black. This range of transition will become smaller as $E_2$ is increased in proportion to $E_1$ or the resistor 28 in proportion to the resistor 29. In this way it is possible to diminish the amplitude difference which echo signals must have as compared to the sea bottom echo in order to be recorded in a distinguishably lighter shade. However, there is no advantage in going too far in this direction as owing to the changes in amplitude of the sea bottom echo there must be maintained a certain distance between the lower limit for echo amplitudes to be recorded in black and the average amplitude of the sea bottom echo. While the amplifier 11 is so dimensioned that its operation is linear up to the amplitude of the sea bottom echo, the output stage of the amplifier 12 may be so designed that the recording current output of this stage is limited at a value only somewhat higher than the current required for completely blackening the paper. Thereby, damage to the recording paper and excessive production of fumes will be avoided irrespective of the adjustment of potentiometer 21.

FIG. 3 shows an echo recording device having two amplifiers in parallel connection in order to record echo signals in a gray or black shade respectively depending on whether the amplitude of the signals is below or above a critical value, this arrangement serving the same purpose as the amplifying apparatus shown in FIG. 2. The two amplifiers are of identical design and of a type individually used in echo recorders. For the present purpose it is essential that the amplifiers have a pronounced saturation characteristic. As the design of the circuits of these amplifiers is not an object of this invention, only a cursory description of their function is given. Component parts having the same function as parts shown in FIG. 2 are designated by the same numerals. The echo recorder, which is shown diagrammatically, employs a belt 40 running over two pulleys 38, 39, which belt carries a marking stylus 16, which is connected with a sliding contact 41, and a cam 42. The belt 40 is driven at a uniform speed by means of a motor 37 via the pulley 38. When the marking stylus 16 crosses the zero-line 43 of the graduation printed on the recording paper 17, a keying contact 44 is actuated by means of cam 42 causing the electron-tube generator 45, to deliver a short pulse of oscillations of a frequency of 30 kilo-cycles to the transducer 46. The sound pulse radiated by the transducer 46 returns as an echo signal after being reflected by an object and is received by the transducer 14. The transduced alternating voltage echo pulse is transmitted to the input terminals 47, 48 of the amplifiers 49, 50 which are in parallel connection. The recording currents issuing from the outputs 51, 52 of the amplifiers are fed in parallel to the marking stylus 16 through the contact rail 54 and sliding contact 41, a resistor 53 being inserted in the path of the current supplied by the amplifier 49. The currents flowing through the recording paper 17 to the platen 18 produce markings on the paper.

The two amplifiers 49, 50 make use of the heterodyne principle. As the circuit arrangements are identical, it will suffice to describe that of one amplifier only. The echo signal having a frequency of 30 kilo-cycles appearing at the input 47 (48) is transmitted through a transformer 55 to the first amplifier stage comprising tube 56 and the tuned plate circuit 57. The amplified signal is fed to the second stage comprising the variable -mu tube 58 with plate circuit 59 which is also tuned to 30 kilo-cycles. The degree of amplification of this stage can be widely regulated by means of a variable resistor 60 (61) between the cathode of the tube 58 and ground. The voltage obtained at the plate of the tube 58 is fed to the mixer tube 62 on which is likewise impressed the alternating current voltage generated by the oscillator tube 63 with resonant circuit 64 tuned to 39 kilo-cycles. The plate circuit 65 of the mixer tube is tuned to 9 kilo-cycles. The alternating current voltage of 9 kilo-cycles obtained at the plate of the mixer tube is fed to a voltage divider comprising a resistor 66 in series with a capacitor 67, serving as a filter for suppressing the frequencies of 30 and 39 kilo-cycles accompanying the desired 9 kilo-cycles signal. The voltage obtained from the junction point of the elements 66 and 67 is impressed on the control grid 70 of the output tube 71 through a resistor 68. The resistor 69 serves for maintaining grid 70 at ground potential. An output transformer 72 in the plate feed line of the tube 71 transforms the 9 kilo-cycles current in the plate circuit of the tube into the recording current delivered at the output ends 51 (52) of the amplifiers.

The maximum recording current which may be supplied by the output tube 71 depends upon the effective range of the control voltage of the grid 70 and also upon the plate resistance of the tube and the resistances contained in the recording circuit. For the negative voltage phase the effective control range is limited by the cut-off potential and for the positive voltage phase by zero grid potential. Due to the voltage drop produced by grid current in the resistor 68, the grid potential cannot increase further. Even when the alternating current voltage across the resistor 69 has a very high value, the recording current supplied by the tube does not increase above the saturation value. The type of tube 71 has been so selected that its saturation value is somewhat higher than the value required for complete blackening of the recording paper. The output leads of the amplifier 50 being directly connected to the recording apparatus, black recordings may be produced by this amplifier. For amplifier 49 the value of the saturation current obtained for maximum grid control is reduced by a resistor 53 to such an extent that only recordings in a gray shade are produced. Due to different setting of the two controls 60 and 61, the echo signals arriving at the input ends 47, 48 are amplified to different degrees in the two amplifiers 49, 50. The amplification of the amplifier 49 is made as high as is compatible with the noise level in the water. Hence, rather feeble echoes from fish will be sufficient to produce an output current yielding recordings in a light gray shade. On a small increase of the amplitude of these echoes the saturation limit will become effective and the intensity of the recordings will not increase any more. The amplification factor of the amplifier 50, which is connected in shunt with amplifier 49 is reduced by suitably adjusting the controller 61 so that only the strong echoes reflected from the solid sea bottom will produce a recording current sufficient for recording in black as already explained above.

Echoes, the amplitude of which is lesser than that of the sea bottom echo up to a certain amount will be recorded in shades of gray which are between the gray shade produced by the amplifier 49 and the black recordings of the amplifier 50. This range of transition is somewhat larger than the corresponding range of the circuit arrangement shown in FIG. 2, but here also it comprises only a small portion of the total range of amplitudes recorded if measured by a decibel scale.

In the range of transition and when recording sea bottom echoes the recording currents of the two amplifiers are superposed. Experience has shown that this does not impair the recording of the sea bottom echo, presumably because the recording current of the amplifier 49 is not higher than half that of the amplifier 50. Undesirable interference between the two amplifiers will be excluded, when the output alternating currents supplied by these amplifiers are rectified and fed to the recorder with the same polarity.

Reduction of the saturation current of the amplifier 49 can also be obtained by lowering the screen grid voltage on the last tube 71. If the output stages of the two amplifiers 49, 50 are connected in series instead of being connected in parallel, a resistor has to be connected in parallel with the output terminals 51 of amplifier 49.

This invention is not restricted to the use of heterodyne-amplifiers as described above. Practically any type of amplifier with variable gain suitable for the use with echo recording apparatus can be used, provided, that it has a saturation characteristic with a sharp bend and approximating a constant value of the output current for high input voltages.

In the above description of FIG. 3 the term "degree of amplification" is used to mean the ratio of the alternating current voltage obtained across the resistor 69 to the alternating current voltage fed to the input 47 (48).

Another way of practicing the invention in a special case is described hereafter. Off estuaries there are frequently found deposits of more or less liquid mud above the solid sand of the seabed. It is desired to record by echo sounding both the profile of the surface of the mud layer and that of the solid seabed below it. Experiments have shown that this problem cannot satisfactorily be solved by using pulses of one frequency alone, even if suitably chosen. Taking the commonly used frequency of 30 kilocycles as an example, the echo obtained from the surface of the mud layer, which, in general, is ill-defined, is so feeble that it disappears in the noise level. A higher frequency will be reflected by the mud layer but will not penetrate to the solid sea bottom. A solution to this problem is found by simultaneously emitting two sounding pulses of different appropriately chosen frequencies, the echoes of which are received separately and applied to one recorder. As the echo curves will frequently overlap and cannot be separated if recorded in the same intensity, it is necessary for the curve giving the depth of the mud layer to be recorded in a lighter shade than the curve for the solid bottom.

Figure 4:
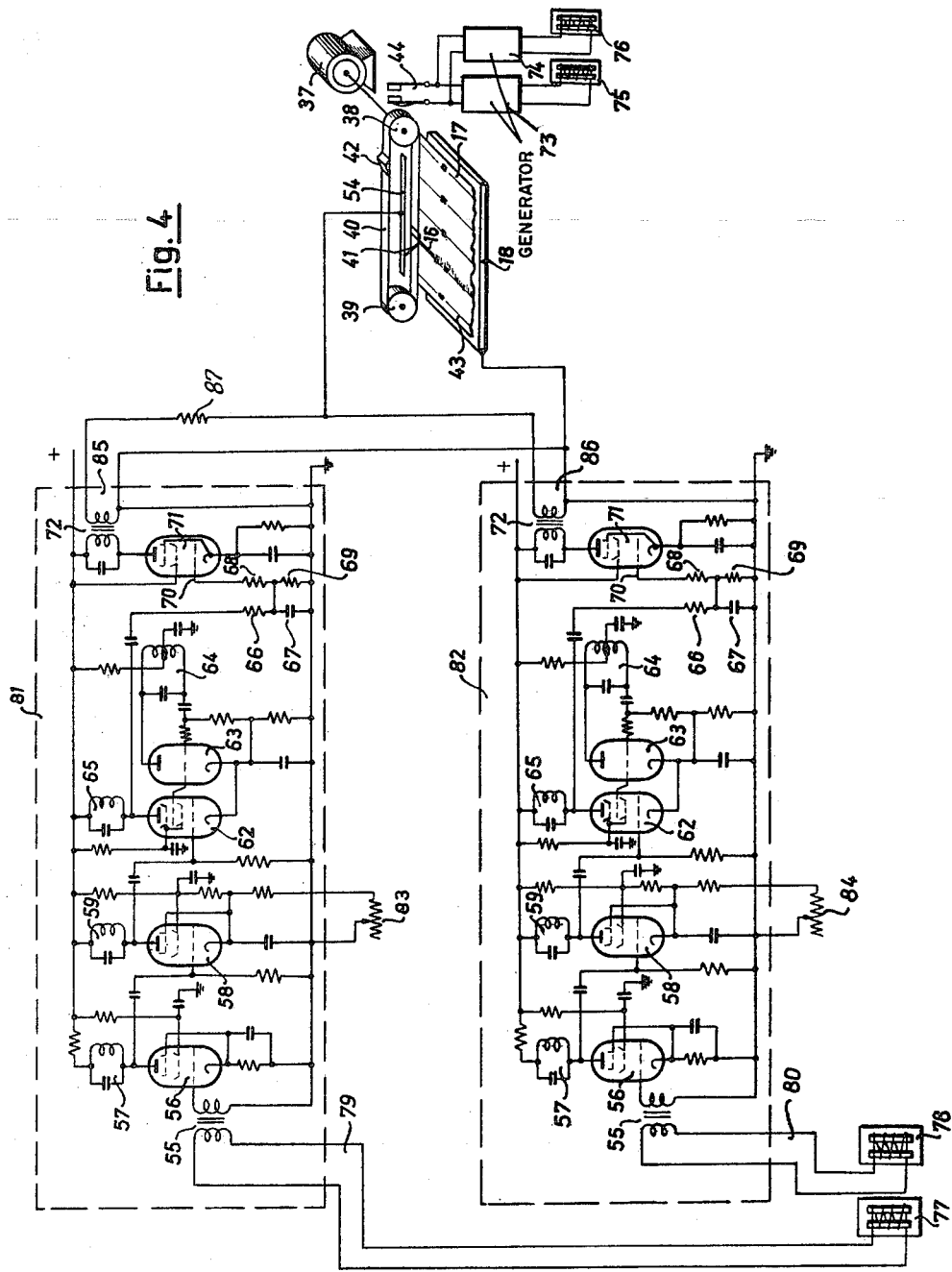
FIG. 4 shows an arrangement of two amplifiers with different saturation values of the output current for the recording of echo signals of different frequencies.

FIG. 4 shows an echo recording arrangement serving the purpose outlined above. The function of the parts 37 to 44, 16 to 18, 54 of the recorder is the same as in the arrangement according to FIG. 3. Contact 44, by closing, keys two tube generators 73, 74 supplying short energy pulses of different frequencies to the transducers 75, 76, which simultaneously emit two short sound pulses of 80 and 15 kilo-cycles. The echoes of these pulses reflected from the seabed are received by the transducers 77, 78 tuned to 80 and 15 kilo-cycles respectively. These transmit the signals to the inputs 79, 80 of the two amplifiers 81, 82 likewise tuned to 80 and 15 kilo-cycles respectively. These amplifiers are of a design identical with that shown in FIG. 3, particularly, their gain can be adjusted by means of the controllers 83, 84 and the output stages exhibit a saturation characteristic, so that the recording currents obtained from the outputs 85, 86 cannot exceed a definite value. For the amplifier 81 the maximum value of the recording current is reduced by means of a resistor 87 inserted in the path of the recording current so that only gray recordings can be produced by it on the paper 17, whereas the saturation current of the amplifier 82 is above the value required for producing completely black recordings. It is not required for the amplifier 82 to have a saturation characteristic as pronounced as that of the amplifier 81. The two recording currents are fed in parallel to the marking stylus 16.

In operation, the 80 kilo-cycles pulse is reflected by the surface of the mud layer, the echo having sufficient intensity because of the high frequency involved. The echo is selectively received by the transducer 77 and the amplifier 81. By control 83 the gain of the amplifier is so adjusted that the last tube of the amplifier 81 is always operating under saturation conditions for the echo signals received with normal fluctuations of the echo amplitude. Hence, all recordings obtained from the surface of the mud layer are made in a gray shade of constant intensity. The 15 kilo-cycles pulse is subject to only moderate reduction of intensity in the mud layer. After being efficiently reflected by the solid seabed this pulse is selectively received as an echo by the transducer 78 and amplifier 82. The gain controller 84 is so adjusted that completely black recordings are obtained for echoes of this kind. The degree of amplification is preferably no greater than necessary for the compensation of normal fluctuations of the echo intensity. Then, the feeble echoes which may be obtained by the 15 kilo-cycles signal being reflected from the surface of the mud layer will cause a voltage amplitude at the grid of the last tube insufficient for recording.

In general the pulses of 80 kilo-cycles are absorbed when penetrating into the mud layer. However, should echoes of this frequency be received from the solid seabed, the recording current thereby produced is added to that originating from the pulses of 15 kilo-cycles. As the latter ones already blacken the paper completely, the slight increase of the recording current has no distinguishable effect. In case the echo recordings obtained from the solid seabed are partly superposed on those obtained from the mud layer, the boundary between mud and solid bottom is clearly distinguishable because of the contrast between the gray shade of the mud echoes and the more intensive blackening of the solid bottom echoes. Another way of operating the equipment consists in emitting the pulses of different frequencies not simultaneously but alternately at the beginning of the travel of the marking stylus over the recording paper.

Figure 5:
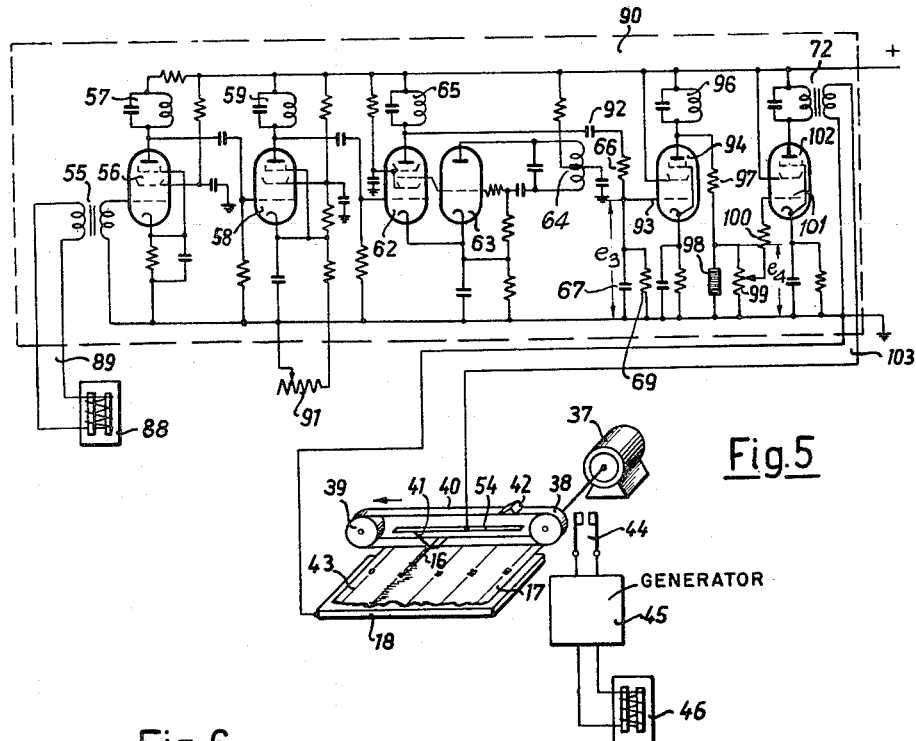
FIG. 5 shows an amplifier for the recording in differing shades of blackening of echo signals from a large range of amplitudes; the characteristic of the amplifier being nearly logarithmic.

This invention is not limited to the use of limiting devices and the production of recordings in two definite, distinguishable shades of blackening. It may be desirable when recording echo signals of different amplitudes from a large range of amplitude to be able to recognize differences of the amplitudes. More particularly, it may be desired to distinguish the logarithms of the amplitude. If blackening is approximately proportional to the logarithm of the amplitude, the order of magnitude of an echo amplitude may be surmised from the degree of blackening. In other words, contrast in the representation of echo amplitudes by means of varying degrees of blackening of the recording paper should be uniformly spread over a range of sufficient magnitude. The normal spread corresponds to a range of amplitudes of approximately 1:3 or 10 decibels. This, however, is not sufficient for the differences in echo amplitudes occurring during practical use of the recorder. Contrast can be spread over a larger range of amplitudes by means of a recording amplifier which incorporates a voltage dependent resistor as shown in FIG. 5. Any or all of amplifiers 49, 50 of FIG. 3 and 81, 82 of FIG. 4 may embody the features of amplifier 90 of FIG. 5.

The voltage dependent resistor (VDR) used in this equipment is made of sintered silicon carbide. The relation between the current I through and the voltage E across the resistor is given by (1) $$E = 100 \cdot I^{0.23}$$

The echo signals of a frequency of 30 kilo-cycles which are received by the transducer 88 are transmitted to the input 89 of the recording amplifier 90. The input transformer 55, the first amplifier stages tuned to 30 kilo-cycles with the elements 56, 57, 58, 59 and the mixer stage 62, 65 with the associated oscillator 63, 64 are identical in construction and function with the parts of FIG. 4 designated by the same numerals. The degree of amplification of the tube 58 in the second stage can be adjusted by means of the variable resistor 91. Amplified echo signals having a transposed frequency of 9 kilo-cycles are obtained at the plate of the mixer tube 62. These signals are applied through a capacitor 92 to a voltage divider comprising the resistors 66, 69. The capacitor 67 in shunt with the resistor 69 serves for the suppression of undesired higher frequencies accompanying the signal of 9 kilo-cycles. The signal voltage $e_3$ across the resistor 69 is impressed on the control grid 93 of the amplifier tube 94. Through the transformer 96 having a primary circuit tuned to 9 kilo-cycles, the amplified signal is fed to a voltage divider consisting of a resistor 97 of 50 kilo-ohms and the voltage dependent resistor 98. The partial voltage appearing at the resistor 98 is designated by $e_4$. By means of a high resistance potentiometer 99 this voltage is divided and part of it applied through resistor 100 to the control grid 101 of the last tube 102. The alternating plate current of this tube, after being converted by the transformer 72 is supplied through amplifier output 103 to the recorder 16, 17, 18. The ratings of the tube 102 are so chosen that no limitation of the recording current due to saturation occurs before the current has exceeded the value required for complete blackening of the paper.

Figure 6:
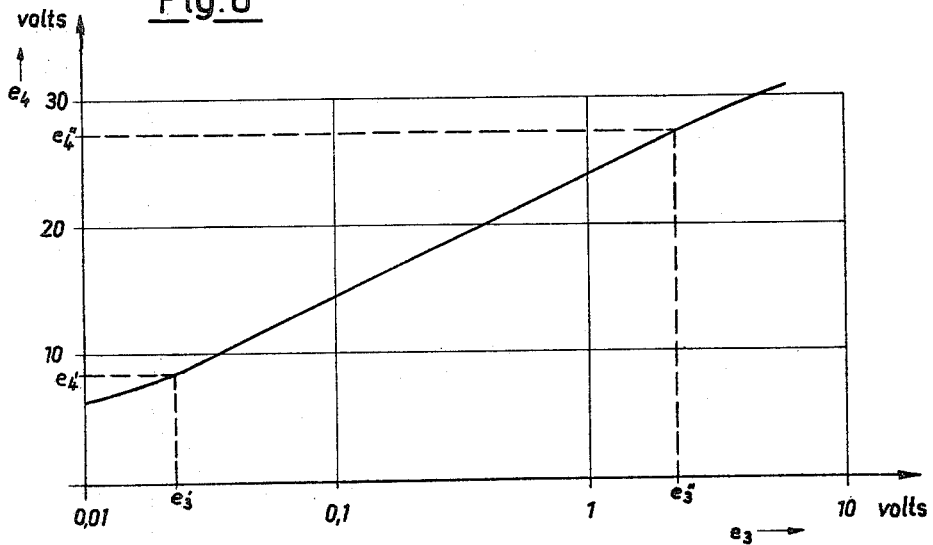
FIG. 6 shows the dependence between the input and output voltage for a section of this amplifier containing a non-linear resistance element.

The operation of the amplifier 90 incorporating the non-linear resistor 69 can be compared to that of a volume compressor responding without time delay. The voltage $e_3$ across the resistor 69 is proportional to the amplitude of a signal fed to the amplifier input stage 89 whereas this is no longer the case with $e_4$, the voltage across the resistor 98. The relation between $e_3$ and $e_4$ as measured is shown by a curve in FIG. 6. A logarithmic scale is used for $e_3$, whereas the scale used for $e_4$ is linear. The middle portion of the curve may be expressed by the equation (2) $$e_4 = a + b \log e_3$$

where $a$ and $b$ are constants. The voltages $e_4'$ and $e_4''$ are so selected as to include a straight-line portion of the curve between them in a ratio of 1 to 3. This insures a representation with uniformly distributed contrast of the voltages between $e_3'$ and $e_3''$. By means of the potentiometer 99 such a fraction of $e_4$ is derived for the control of the last tube 102 that with $e_4$ equal to $e_4''$ the recording current will just be sufficient to completely blacken the paper. Then, with $e_4$ equal to $e_4'$ a recording in a just recognizable gray shade will be obtained. Consequently, by varying $e_3$ from $e_3'$ to $e_3''$ the whole scale of blackening available will be traversed. According to FIG. 6 $e_3'$ and $e_3''$ are in the ratio of 1 to 100 or 40 decibels. This is a considerable improvement when compared with the 10 decibels range commonly available. It has been found that in the range where the Equation 2 is valid, variations of the amplitude of the signal by a certain number of decibels cause approximately equal differences in blackening for the eye. The control voltages appearing at the grid 101 of the last tube 102 for signal voltages between $e_3'$ and $e_3''$ are within the effective grid control range so that no peak limitation or saturation occurs for these voltages.

Once correctly adjusted, the setting of potentiometer 99 is left unchanged. The initial level of the range of amplitudes of input voltages which is to be recorded with varying intensity may be selected at will by the operator. This is done by varying the degree of amplification of that part of the amplifier preceding the resistor 69 by means of the controller 91. For instance, the range may be chosen to comprise echo signals of from 0 to 40 decibels or 15 to 55 decibels above the noise level. Feebler echo signals are not recorded, whereas stronger signals are recorded in a completely black shade.

What we claim is:

1. In an echo sounding device for simultaneously recording echoes from objects yielding echoes of different amplitudes, a transducer for receiving the echoes, vacuum tube amplifying means having an output stage and having an input connected to said transducer, a recorder including a recording paper adapted to be supplied with recording currents from said output for markings on the recording paper with marks of varying intensity, a non-linear resistance element in the plate circuit in one of the tubes of said amplifying means preceding the output stage, this element being of such a nature that the voltage at its terminals increases less than proportional to the increase of current, means for controlling the gain in the part of the amplifier preceding the non-linear element, voltage dividing means for adjusting the voltage controlling the output stage, this voltage dividing means being employed to adjust the output current to a desired value for a certain voltage at the terminals of the non-linear element.

2. In an echo sounding device for simultaneously recording echoes from different objects, two transducers emitting sound pulses of different frequencies to be reflected selectively by two kinds of objects, two other transducers for selectively receiving the echoes of different frequencies, two amplifiers, each of which is tuned to one of the frequencies, having an input connected to the respective receiving transducer and an output, a recorder having a marking stylus and a recording paper, said outputs supplying recording currents, both the recording currents passing from said marking stylus to the electrosensitive recording paper, means for limiting the recording current being supplied by one of the amplifiers being comprised in the amplifier, means for adjusting the current limit to a value producing recordings in a gray shade on said recording paper, the other amplifier being adapted to produce recordings in black, and means for individually adjusting the amplification factor of both amplifiers.

3. In echo sounding equipment, a receiving system for recording received first echo signals having amplitudes between a minimum value chosen at will and a higher critical value also chosen at will by markings on electrosensitive paper the intensity of which is consistently and substantially smaller than the maximum producible intensity and for recording other received echo signals having amplitudes larger than said critical value by markings having intensities greater than those produced by the first echo signals; said receiving system comprising a transducer for receiving echo signals, a recorder including a deflectable stylus and a conducting platen, a recording strip made of electrosensitive paper movable over the platen and periodically traversable by said stylus, and a transmission system connected between the output of the transducer and the input of the recorder, said transmission system comprising a preamplifier, an output amplifier and two electrical transmission channels having common input and output terminal pairs and including a common load resistance connected across the output terminal pair and a common lead connecting one of the input terminals to one of the output terminals, said transmission channels being connected in parallel between the output of the preamplifier and the input of the output amplifier, the first of said transmission channels comprising a potentiometer connected across the input terminal pair and having an adjustable tap, of two series combinations of a diode and a potential source arranged to become conductive in both directions for applied signal voltages exceeding a first predetermined amplitude level, said series combinations being connected in parallel, a first resistor connected between the tap of the potentiometer and one end of said parallel combination the other end of said parallel combination being connected to the common lead, and a second resistor connected between the junction of the first resistor and said parallel combination and the output terminal not directly connected to one of the input terminals, the first resistor serving to prevent undue load on the potentiometer when said parallel combination is conductive and the second resistor serving to decouple the common output of both channels from said parallel combination, the amplitude of received echo signals passing through said first channel through the output amplifier being limited by proper choice of said first predetermined amplitude level to a value sufficient only for producing markings on the electrosensitive paper of definitely below maximum producible intensity and adjustment of the potentiometer tap serving to select said first-mentioned minimum amplitude value, the second of said transmission channels comprising a second potentiometer connected across the joint terminal pair and having an adjustable tap, a second pair of series combinations of a diode and a potential source arranged to permit current flow in both directions only for applied signal voltages exceeding a second predetermined amplitude level which is higher than said first predetermined amplitude level, said pair of series combinations being connected in parallel, and between the tap of the second potentiometer and the output terminal not directly connected to one of the input terminals, adjustment of said second potentiometer tap serving to set said first predetermined amplitude level.

4. In echo sounding equipment for recording received echo signals on electrosensitive paper susceptible of receiving markings of between zero and maximum intensity in correspondence to the amplitude of applied electrical signal pulses whose amplitude for producing visible markings has to be above a threshold value characteristic of the paper employed; a receiving system comprising a transducer for receiving echo signals, a recorder including electrode means arranged for producing markings on the electrosensitive paper in correspondence to applied electrical signal pulses, and two parallel signal transmission channels feeding common amplifier means and having at least in common two input and two output terminals by which said channels are connected between said transducer and said recorder, each of said channels also including separate leads having common input and output terminals, means incorporated in one of said separate leads limiting the amplitude of signals transmitted via said lead as appearing at the recorder input to a value sufficient only for producing markings of definitely below maximum producible intensity, varying means also incorporated in said last-mentioned lead and preceding the limiting means for varying the signal amplitude applied to said limiting means in correspondence to received echo signals, adjustment of said varying means serving to set a signal amplitude minimum value, a second varying means connected in the other of the separate leads for varying the amplitude of signals transmitted via that lead to the recorder in correspondence to receiving echo signals, said second varying means serving to select a critical minimum signal amplitude value greater than said first-mentioned minimum value which said echo signals must exceed to render said other lead transmissive.

5. In echo sounding equipment, a receiving system including a transducer for receiving echo signals, a recorder arranged for producing markings on electrosensitive paper in correspondence to applied recording signals, the intensity of the markings requiring an applied minimum recording signal amplitude different from zero to be perceptible and increasing up to a maximum recording signal amplitude which cannot be exceeded as the applied signal amplitude is increased, and a transmission system electrically interconnecting the transducer and the recorder, said transmission system comprising limiting means for limiting the amplitude of applied signals to a predetermined level, means for obtaining signals the amplitude of which is a selected function of the received echo signals applied to the limiting means, means for obtaining other signals the amplitudes of which are another selected function of the received echo signals, means for combining the signals from the output of the limiting means and said other signals to provide said recording signals to the recorder, said recording signals being maintained within said minimum and said maximum recording signal amplitudes, said selected functions being determinative of said minimum and maximum recording signal amplitudes.

6. In an echo sounding system, apparatus for recording received echo signals in contrasting intensity on electrosensitive paper having a predetermined maximum contrast level comprising, transducing means for receiving echo signals and providing corresponding electrical signals of proportionate amplitude, first and second electrical networks each having an input terminal pair jointly energized by said corresponding electrical signals and an output terminal pair, said first network having first gain adjusting means followed by upper limiting means, said upper limiting means limiting the maximum amplitude of signals provided at said first network output terminal pair to a predetermined upper value, said second network having second gain adjusting means and capable of providing an output signal having an amplitude greater than said predetermined upper value, the gain afforded by said first gain adjusting means being greater than that afforded by said second gain adjusting means, means for combining the signals on said first and said second network output terminal pairs to provide a proportionate recording signal, recording means, and means for applying said recording signal to said recording means, said first gain adjusting means being set so that said recording signal due to a first network output signal of said predetermined upper value is just sufficient to establish trace markings on said electrosensitive paper below said maximum contrast level, said second gain adjusting means being set so that said recording signal including a second network output signal a predetermined amount greater than said predetermined upper value is sufficient to establish trace markings on said electrosensitive paper at said maximum contrast level.

7. Apparatus in accordance with claim 6 and further comprising, lower limiting means in said second network following said second gain adjusting means for establishing a predetermined finite minimum amplitude value of a signal provided at said second network output terminal pair, the latter minimum amplitude value being greater than said predetermined upper value.

8. Apparatus in accordance with claim 7 and further comprising, means responsive to said combined output signals for establishing a nonlinear relationship between said recording signal amplitude and the combined signals when the amplitude thereof is between said predetermined upper and minimum values.

9. Apparatus in accordance with claim 7 and further comprising, means for preventing the maximum amplitude of said recording signal from exceeding a safe level, said safe level being slightly greater than the amplitude required to establish said maximum contrast level on said electrosensitive paper.

10. In an echo ranging system, a display system comprising, transducing means responsive to echo signals for providing corresponding electrical signals of proportionate amplitude, a first channel responsive to all of said electrical signals whose amplitude is greater than a first predetermined minimum value for providing an output recording signal which does not exceed a predetermined first maximum amplitude, and a second channel responsive to all of said electrical signals whose amplitude is greater than a second predetermined minimum value higher than said first minimum value for increasing the amplitude of said recording signal beyond said first maximum amplitude.

11. Apparatus in accordance with claim 10 and further comprising, means for preventing said recording signal amplitude from exceeding a predetermined second maximum amplitude, said second maximum amplitude being greater than said first maximum amplitude.

12. A method of displaying echo signals which method includes the steps of classifying the received echo signals into weak and strong echo signals, transmitting both weak and strong signals through a first channel to develop a recording signal whose amplitude is less than a first predetermined value, and transmitting only the strong signals through a second channel to increase the amplitude of said recording signal beyond said first predetermined value, and applying said recording signal to a recording medium to establish visible indicia thereon, the contrast of said indicia increasing when said recording signal exceeds said first predetermined value.

13. A method of displaying echo signals in accordance with claim 12 and further including the step of preventing the amplitude of said recording signal from exceeding a second predetermined value corresponding substantially to the maximum contrast recordable upon said medium.

14. In an echo sounding system, apparatus for recording received echo signals in contrasting intensity on electrosensitive paper having a predetermined maximum contrast level comprising, transducing means for receiving echo signals having a first characteristic when reflected from a first type of object and a second characteristic when reflected from a second type of object, a first channel responsive at least to said signals having said first characteristic for providing a recording signal which does not exceed a predetermined first maximum amplitude sufficient to visibly mark said electrosensitive paper but insufficient to provide maximum contrast thereon, and a second channel responsive only to said signals having said second characteristic for increasing said recording signal amplitude beyond said first maximum amplitude to mark said paper with correspondingly increasing contrast.

15. Apparatus in accordance with claim 14 and further comprising, means for preventing said recording signal amplitude from exceeding a second maximum amplitude corresponding substantially to maximum recordable contrast upon said paper.

16. In an echo ranging system, apparatus comprising, transducing means responsive to echo signals having a first characteristic when reflected from a first type of reflector and a second characteristic when reflected from a second type of reflector, a first channel responsive at least to said signals having said first characteristic for providing a recording signal which does not exceed a predetermined first maximum amplitude, and a second channel responsive only to said signals having said second characteristic for increasing said recording signal beyond said first maximum amplitude.

17. Apparatus in accordance with claim 16 and further comprising, means for preventing said recording signal from exceeding a predetermined second maximum amplitude greater than said first maximum amplitude.

18. Apparatus in accordance with claim 16 and further comprising, a recording medium, and means responsive to said recording signal for visibly recording representations of echo signals with said first characteristic and echo signals of said second characteristic with visible contrast upon said recording medium in response to said recording signal.

19. In an echo sounding device for simultaneously recording echoes from objects yielding echoes of different amplitudes, a transducer for receiving the echoes and producing pulse voltages, two amplifiers having means for individually varying the voltage gain of the amplifiers in the stages preceding the output stage with their inputs connected to receive said pulse voltages from the transducer and with their outputs connected to a recorder, said recorder including a recording paper acted upon by the output current of said amplifiers, means for reducing the saturation current of the output stage of one of the amplifiers to a value producing markings on the recording paper of an intensity intermediate between zero and maximum intensity, means for establishing the saturation current of the other amplifier remaining above such value producing marking of maximum intensity, said means for individually varying the voltage gain of the amplifiers in the stages preceding the output stage establishing respective voltage gains whereby the echo signals passed by one amplifier will produce lighter recorded records of signals than that passed by the other of said amplifiers.

20. In echo sounding equipment, a receiving system for recording on electrosensitive paper visible markings of intensity representative of the intensities of corresponding received echo signals, said receiving system comprising transducing means for receiving said echo signals, a first and a second transmission channel with inputs connected in parallel to said transducing means and with outputs also connected in parallel, recording means connected to said parallel outputs for producing marks on electrosensitive paper in correspondence to received echo signals with intensity proportional to the signal delivered by said parallel outputs, said transmission channels comprising amplifying stages and regulating means for varying the amplification in a portion of said channels, means forming part of the first channel and electrically connected to the variable amplification stage for limiting the output signal delivered by said channel to a value causing said recording means to mark said electrosensitive paper with an intensity less than the maximum intensity and greater than the minimum intensity recordable on said electrosensitive paper, the setting of said regulating means in said first channel being adjusted to a setting causing said first channel to respond to echo signals received by said transducing means of an amplitude greater than a predetermined minimum amplitude by providing a first channel output signal applied to said recording means producing markings of said intermediate intensity, the setting of the regulating means in said second channel being set so that said second channel responds to echo signals received by said transducing means greater than said predetermined minimum amplitude by a predetermined difference by providing an output signal to said transducing means sufficient for producing marks of said maximum intensity on said electrosensitive paper.

21. A receiving system constructed in accordance with claim 20 wherein each of said transmission channels comprises means for rectifying the output current pulses corresponding to the received echo signals before feeding them in parallel to said recorder.

References Cited in the file of this patent

UNITED STATES PATENTS

| | | |
|---|---|---|
| 2,433,382 | Marrison | Dec. 30, 1947 |
| 2,457,131 | Curtis | Dec. 28, 1948 |
| 2,554,905 | Hawkins et al. | May 29, 1951 |
| 2,651,963 | Bischoff | Sept. 15, 1953 |
| 2,817,715 | Blake | Dec. 24, 1957 |
| 2,558,868 | McCarty | July 3, 1961 |

FOREIGN PATENTS

| | | |
|---|---|---|
| 329,403 | Great Britain | May 22, 1930 |